C. B. TRESCOTT.
LOW TEMPERATURE COOKING APPARATUS.
APPLICATION FILED MAY 21, 1920.
1,357,011. Patented Oct. 26, 1920.
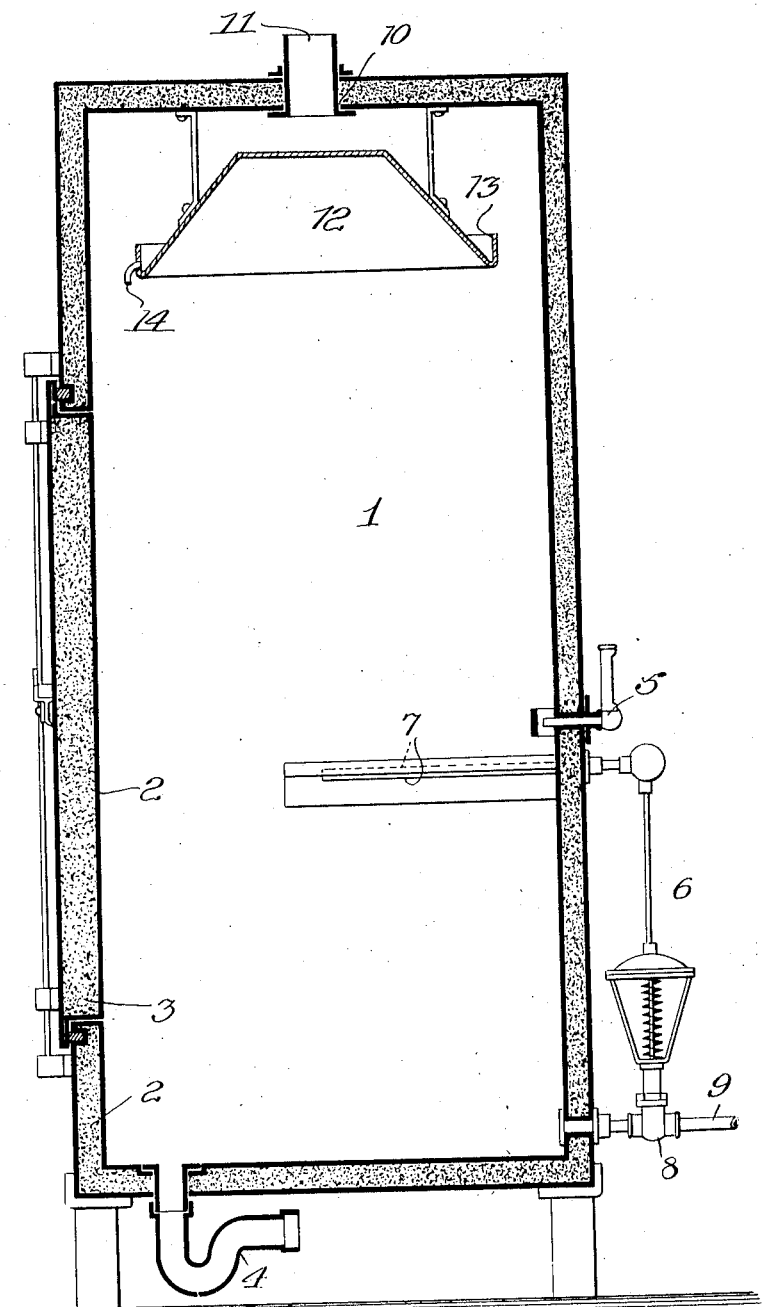
Inventor:
Charles B. Trescott,
By Dyrenforth, Lee, Chritton & Wiles
Att'ys

UNITED STATES PATENT OFFICE.

CHARLES B. TRESCOTT, OF CHICAGO, ILLINOIS.

LOW-TEMPERATURE COOKING APPARATUS.

1,357,011.     Specification of Letters Patent.     Patented Oct. 26, 1920.

Application filed May 21, 1920. Serial No. 383,091.

*To all whom it may concern:*

Be it known that I, CHARLES B. TRESCOTT, a citizen of the United States, residing at 341 North Menard avenue, Chicago, in the county of Cook and State of Illinois, have invented a new and useful Improvement in Low-Temperature Cooking Apparatus, of which the following is a specification.

My invention relates to an improvement in the apparatus of my Patent No. 1,233,000, dated July 10, 1917, for practising the low temperature cooking process which is the subject of my Patent No. 1,226,147, dated May 15, 1917.

The aforesaid patented apparatus is primarily intended for the industrial cooking of salt meats, and more especially hams, accompanied by avoidance of shrinkage as an important object, by cooking at the lowest practicable temperature of 150° F. or thereabout, and thus relatively slowly. In employing such comparatively low temperature the introduction of steam should be interrupted to promote proper condensation of the steam between intervals for affording the requisite quantity of condensate for heating and saturating with moisture the air in the cooking chamber.

In employing my aforesaid patented process for hotel, restaurant and domestic cooking of meats and vegetables, wherein avoidance of shrinkage is a neglible consideration because the exuded juices are saved in pans holding the food in the cooker, it is desirable to expedite the cooking, which requires a relatively higher temperature to be used of 170° F. or thereabout, for meats and 200° F. or thereabout for vegetables.

The accompanying drawing is a vertical sectional view of my improved apparatus as it is equipped for the low temperature cooking of meats. For such cooking of vegetables the equipment may be modified as and for reasons hereinafter explained.

The present cooker is of the general construction of that illustrated in my said apparatus patent. It comprises a cooking chamber 1 and a door 2, all formed of sheet metal double walls filled with insulating material 3, and equipped with a bottom drain pipe 4, a thermometer 5 extending into the interior of the chamber through a side wall thereof, and a known type of thermostat 6 having a shielded tube-extension 7 within the chamber. The thermostat operates a valve, indicated at 8, to regulate the introduction, through a pipe 9, of steam into the lower part of the cooking chamber from a suitable source of live steam (not shown), which should enter the chamber at a pressure of about ten pounds (temperature about 240° F.).

An opening 10, of about two inches in diameter for the ordinary size of my improved meat cooker, is provided centrally through the top wall of the chamber 1 and has a short pipe or duct 11 secured in it; and immediately below this opening is suspended a baffle 12, preferably of the general downwardly flaring or hood shape illustrated and having formed about its lower edge a gutter 13, from which a drip-pipe 14 extends.

In using my improved apparatus for the low temperature cooking of meats by my said process, the steam entering the chamber 1 through the pipe 9 under thermostatic regulation of the valve, rises in the chamber, wherein it encounters the hood 12 to retard its escape through the outlet 10 and resultant unduly rapid exhaust of heat from the chamber. The hot air saturating condensate, which is of fog-like character, by being baffled precipitates in and fills the chamber to perform its cooking function. Condensate precipitating upon the outer surface of the hood 12 runs down it into the gutter, whence it discharges through the pipe 14 into the chamber. The exhaust of hot vapors through the opening 10 tends to cool the air in the cooking chamber, but the constant supply of steam thereto is so regulated in quantity by the thermostat as to compensate for the loss of heat thus exhausted and maintain constant the required cooking temperature in the chamber 1. As will be understood, the thermostat should be adjusted or set to prevent complete closing of the valve and to so control the latter as to render the steam introduction constant but regulable in quantity to replenish the heat exhausted through the opening 10 and maintain the predetermined moist heat condition in the cooking chamber.

For the low temperature cooking of vegetables, the steam should be introduced into the cooker at a pressure of about three pounds (temperature about 220° F.). To use my improved apparatus for that purpose, no such nicety of temperature regulation in the cooking chamber is required as in cooking meats, so that the thermostat equipment and even the thermometer may be omitted from the apparatus, and the valve 8 may be hand operated to enable the operator to regulate the supply of steam to compensate for the cooling tendency of the exhaust through the opening 10, which then need be only about an inch in diameter, since the exhaust may be less copious because the steam may be retained longer in the chamber 1 by reason of the relatively lower temperature at which it is introduced therein and the higher temperature (200° F.) employed for the vegetable cooking purpose.

I realize that considerable variation is possible in the details of construction herein shown and described, and I do not intend by illustrating a single specific or preferred embodiment of my invention to be limited thereto, it being my intention in the following claims to claim protection for all the novelty there may be in my invention as fully as the state of the art will permit.

I claim:

1. A low-temperature cooking apparatus comprising a cooking chamber having a valved steam-supply pipe leading into its lower part, an upper exhaust-opening, and a baffle interposed in the chamber in the path therethrough to said opening.

2. A low-temperature cooking apparatus comprising a cooking chamber having a valved steam supply pipe leading into its lower part, an upper exhaust opening, and a downwardly flaring baffle supported within said chamber in the path therethrough to said opening.

3. A low-temperature cooking apparatus comprising a cooking chamber having a valved steam supply pipe leading into its lower part, an upper exhaust opening and a downwardly flaring baffle supported within said chamber in the path therethrough to said opening and provided with a condensate intercepting and discharging gutter.

CHARLES B. TRESCOTT.